US011420831B2

(12) United States Patent
Chang et al.

(10) Patent No.: US 11,420,831 B2
(45) Date of Patent: Aug. 23, 2022

(54) ITEM PICK-UP SYSTEM

(71) Applicant: NIKE, Inc., Beaverton, OR (US)

(72) Inventors: Wen-Ruei Chang, Changhua (TW); Kuo-Hung Lee, Douliou (TW); Hung-Yu Wu, Changhua (TW)

(73) Assignee: NIKE, Inc., Beaverton, OR (US)

( * ) Notice: Subject to any disclaimer, the term of this patent is extended or adjusted under 35 U.S.C. 154(b) by 335 days.

(21) Appl. No.: 16/707,928

(22) Filed: Dec. 9, 2019

(65) Prior Publication Data

US 2020/0180876 A1 Jun. 11, 2020

Related U.S. Application Data

(60) Provisional application No. 62/778,150, filed on Dec. 11, 2018.

(51) Int. Cl.
| | |
|---|---|
| *B65G 47/91* | (2006.01) |
| *B25J 9/16* | (2006.01) |
| *B25J 15/06* | (2006.01) |
| *B65G 47/90* | (2006.01) |

(52) U.S. Cl.
CPC .......... *B65G 47/917* (2013.01); *B25J 9/1697* (2013.01); *B25J 15/065* (2013.01); *B25J 15/0616* (2013.01); *B25J 15/0658* (2013.01); *B65G 47/905* (2013.01); *B65G 47/91* (2013.01)

(58) Field of Classification Search
CPC .............................. B65G 47/917; B65G 47/91
See application file for complete search history.

(56) References Cited

U.S. PATENT DOCUMENTS

| | | | | |
|---|---|---|---|---|
| 4,389,064 A | * | 6/1983 | Laverriere | B66C 1/025 |
| | | | | 428/136 |
| 4,850,627 A | * | 7/1989 | Franklin | B65B 35/38 |
| | | | | 294/183 |

(Continued)

FOREIGN PATENT DOCUMENTS

| | | |
|---|---|---|
| CN | 201483812 U | 5/2010 |
| DE | 202009014154 U1 | 1/2010 |

(Continued)

OTHER PUBLICATIONS

International Preliminary Report on Pantentability received for PCT Patent Application No. PCT/US2019/065427, dated Jun. 24, 2021, 9 pages.

(Continued)

*Primary Examiner* — Thomas Randazzo
(74) *Attorney, Agent, or Firm* — Shook, Hardy & Bacon L.L.P.

(57) ABSTRACT

An apparatus for picking up and positioning an item includes a vacuum assembly capable of applying a suction force to the item. The apparatus further includes an item engaging plate positioned adjacent the vacuum assembly in a first position for engaging with and picking the item. The engaging plate is moveable to a second position by one or more actuators that reduce a suction force experienced at the engaging plate to deposit or place the item. The one or more fans may additionally be controlled to limit a suction force generated during a disengagement operation where the item is being deposited or placed.

19 Claims, 9 Drawing Sheets

(56) References Cited

U.S. PATENT DOCUMENTS

| | | | | |
|---|---|---|---|---|
| 2005/0226711 A1* | 10/2005 | Schnoor | ................ | B65G 61/00 |
| | | | | 414/736 |
| 2006/0082172 A1* | 4/2006 | Clark | .................. | B25J 15/0616 |
| | | | | 414/752.1 |
| 2007/0228751 A1* | 10/2007 | Viavattine | ........... | H01M 4/0435 |
| | | | | 294/188 |
| 2012/0319416 A1* | 12/2012 | Ellis | .................... | B25J 15/0616 |
| | | | | 414/800 |
| 2013/0127194 A1* | 5/2013 | Regan | ................ | B25J 15/0061 |
| | | | | 294/188 |
| 2017/0210572 A1* | 7/2017 | Alberti | .................. | B65G 43/08 |
| 2019/0061175 A1* | 2/2019 | Kawamoto | .......... | B65G 47/917 |

FOREIGN PATENT DOCUMENTS

| | | | | |
|---|---|---|---|---|
| JP | 2002321182 A | * | 11/2002 | ............. B25J 15/06 |
| JP | 2002321182 A | | 11/2002 | |
| TW | 201132569 A | | 10/2011 | |

OTHER PUBLICATIONS

Office Action received for European Patent Application No. 19839187.2, dated Jul. 20, 2021, 3 pages.
International Search Report and Written Opinion received for PCT Patent Application No. PCT/US2019/065427, dated Apr. 3, 2020, 12 pages.

* cited by examiner

ITEM PICK-UP SYSTEM

CROSS-REFERENCE TO RELATED APPLICATIONS

This application claims the benefit of priority to U.S. Provisional Application No. 62/778,150, filed Dec. 11, 2019, and entitled "Item Pick-Up System." The contents of which are hereby incorporated by reference herein.

TECHNICAL FIELD

Aspects hereof relate to a system for picking up and placing items. More particularly, the present invention relates to a pickup system that uses a vacuum force to pick up and place the item, for example for construction of a shoe upper.

BACKGROUND

While automated manufacturing processes have benefitted a number of industries, the automated manufacturing of soft goods made from pliable items has proven challenging to automate. For example, the manufacturing of shoes and, more particularly, shoe uppers, has long involved a large amount of hand labor. Because shoe uppers are often formed largely or entirely from multiple pliable items that are affixed together to form the completed shoe upper, even the fundamental manufacturing operation of picking up a part for a shoe upper and appropriately placing that part relative to other components has been a challenge to automate.

BRIEF SUMMARY

Aspects hereof provide automated systems to pick up and place pliable items. More particularly, the present invention relates to systems that use a suction force to pick up and place one or more pliable items. Pliable items picked up and placed using apparatuses, systems and methods in accordance with the present invention may particularly comprise components of a soft good, such as a shoe upper.

Aspects include an apparatus for picking up and positioning an item including a vacuum assembly capable of applying a suction force to the item. The apparatus further includes an item engaging plate positioned adjacent the vacuum assembly. The engaging plate includes at least one aperture formed therein so that the suction force can be applied to the item through the aperture. The engaging plate is positionable by one or more actuators in a first position adjacent the vacuum assembly and in at least a second position separated from the vacuum assembly. The apparatus is able to pick up an item in the first position and release an item in the second position. Aspects also contemplate adjusting a suction force in concert with adjusting a position of the item engaging plate relative to the vacuum assembly.

This summary is provided to enlighten and not limit the scope of methods and systems provided hereafter in complete detail.

DESCRIPTION OF THE DRAWINGS

The present invention is described in detail herein with reference to the attached drawing figures, wherein.

DETAILED DESCRIPTION

Figure 1:
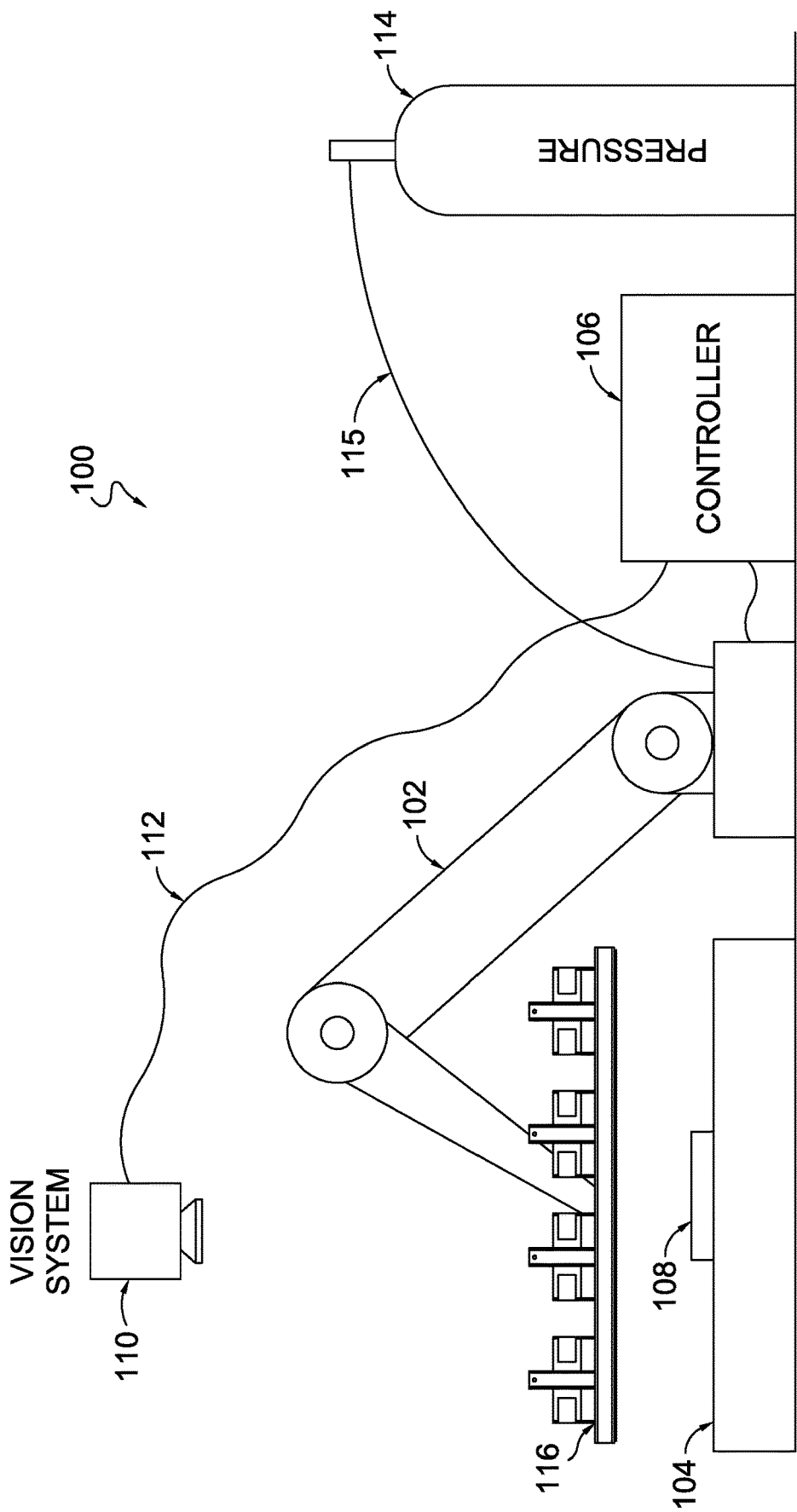
FIG. 1 depicts an exemplary pick-up system, in accordance with exemplary aspects hereof.
Figure 2:
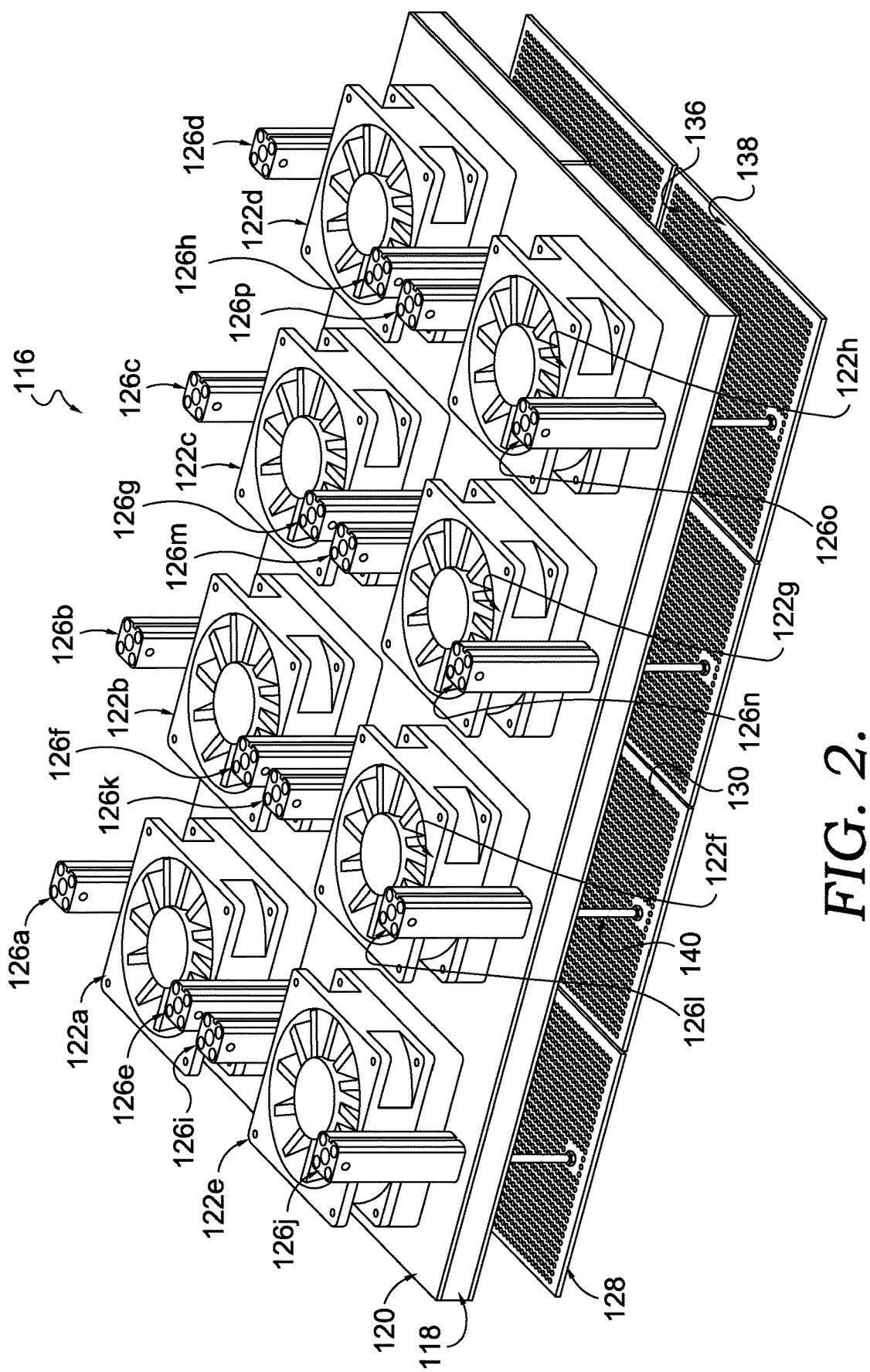
FIG. 2 depicts a top perspective view of an exemplary pick-up head having eight independently actuated zones, in accordance with exemplary aspects hereof.

Aspects hereof provide apparatuses, systems and/or methods to pick up and place one or more items, such as a piece of material or fabric. A vacuum structure has been used in the past to apply a suction force to an item so that the item engages the structure and can be moved from one position to another by for example a robotic arm. However, often it is difficult to precisely turn the suction between the "on" and "off" positions. This results in imprecise placement of an item. Thus, there is a need to interrupt the suction force to result in more precise placement of the item. When there is a suction force capability with a head, the ability to precisely control the suction force is important for the precise placement of an item.

In a first aspect, an apparatus for picking up and positioning an item is provided that includes a vacuum assembly capable of applying a suction force to the item. The apparatus further includes an item engaging plate positioned adjacent the vacuum assembly and having at least one aperture formed therein so that the suction force can be applied to the item through the aperture. The item engaging plate is positioned adjacent the vacuum assembly in a first position (e.g., a first distance offset from the vacuum assembly) and the item engaging plate is positioned farther from the vacuum assembly in a second position. The first position allows the apparatus to pick up an item and the second position allows the apparatus to release the item.

Another aspect provides an apparatus for moving an item from one location to another location including a mechanical arm capable of moving from one location to another. The apparatus includes a pick-up head coupled to the mechanical arm that is capable of engaging and disengaging the item. The pick-up head includes an engaging plate for directly contacting the item. The engaging plate is divided into a plurality of independently actuated pick-up zones. Each zone has at least one aperture formed therein. The pick-up head also includes a vacuum mechanism capable of providing a suction force to each of the pick-up zones. Also included is a plurality of independently controlled actuators, with at least one of each of the actuators associated with one of the pick-up zones. The plurality of actuators allow each pick-up zone to be moved between a first position at a first distance from the vacuum mechanism to a second position that is a greater distance from the vacuum mechanism. The first position aids in the pick-up head being able to pick up an item and the second position aids in the pick-up head being able to release the item.

Methods are provided for positioning an item from one location to another location using a pick-up head having a plurality of pickup zones and a vacuum mechanism. In an exemplary method, a suction force is selectively applied to one or more of the pickup zones to pick up the item. Still further the suction force is selectively adjusted by adjusting a distance an engaging plate is positioned relative to a vacuum mechanism to disrupt a suction force flowing through apertures of the engaging plate.

Systems and methods in accordance with the aspects hereof may provide a tool head positionable in three dimensions to engage an item, move the item, and place the item at a different location. A variety of apparatuses, such as robotic arms, x-y tables, swinging arms, and the like, may be employed to position a tool head in three dimensions. Further, the positioning of a tool head in two dimensions comprising a plane substantially parallel to the plane defined by the item may be performed independent from movement of the tool head relative to a line perpendicular to that plane. For example, an x-y table may be used to position a tool head at a desired location in a horizontal plane. Meanwhile, the tool head may be moved to various heights relative to the x-y table (or any other point of reference, such as a surface holding or receiving an item) independent from its horizontal positioning. Further, a tool head may be rotatable to permit an item to be rotated while retained in order to place the item at the placement location with a desired orientation. The desired placement location at which an item is placed using systems and methods in accordance with aspects hereof may be defined relative to other components of a fully or partially assembled product, such as a shoe upper.

A variety of systems may be used to define and/or identify the locations at which a tool head should engage and/or disengage an item. For example, vision systems (e.g., a vision system 110 depicted in FIG. 1) utilizing cameras, lasers, or other types of detectors may be used to identify items to be picked up and/or to locate the position at which to ultimately place the item. Alternatively/additionally, a computing device (e.g., a controller 106 of FIG. 1) may be provided with predetermined locations to pick up and/or place an item in controlling the operations of systems and/or methods in accordance with aspects hereof. Any type of predefined location system, location detection system, or other technology may be used to determine and/or define a starting location (and orientation) to pick up an item and/or a placement location (and orientation) to place an item in accordance with the aspects hereof.

With reference to FIG. 1, an exemplary pick-up system 100 is depicted in accordance with aspects hereof. The system 100 includes a rotatable mechanical arm 102 capable of rotating between a first manufacturing location 104 and a second manufacturing location. The mechanical arm 102 can be a robotic arm controlled by a computer processor or controlled remotely by a manual operator, or in any other suitable manner. The locations 104 can be any suitable locations in a manufacturing process, for instance locations in the manufacturing of a shoe upper. The pick-up system 100 can be used to move an item 108, for instance a shoe upper part, from the location 104 to a second location or vice versa. The item 108 can be any type of material, for instance, but not limited to fabric (knit, braided, woven, non-woven), rubber, plastic, metal, composite or wood. The item 108 can also be of any suitable shape for instance a planar, curved, or irregular shape. Virtually any type of material could be picked up by the system 100.

A controller 106 is logically coupled (e.g., wired or wireless) to one or more components of the system 100. The controller is comprised of a processor and memory, such as a computing device, capable of controlling one or more components of the system 100. For example, the controller 106 may process computer readable instructions for controlling one or more elements of a pick-up head assembly 116, as will discussed hereinafter. Additionally, the controller 106 is logically coupled by a coupling 112 with the vision system 110, which may be optional in an example. The controller 106 may receive information from the vision system 110 to determine an item to be picked up, a position of an item to be picked up, a location of an item relative to the pick-up head assembly 116 (prior to or post pick up). Further, the controller 106 may be functional to coordinate a position of the mechanical arm 102. As such, the controller 106 (or a plurality of controllers) are effective to control and coordinate one or more components/elements of the system 100 to aid in the pickup, positioning, and placing of an item by the system 100.

The pressure source 114 is a source of fluid pressure, such as air pressure. The pressure source 114 may be a compressor capable of generating pressurized fluid for use by one or more components, such as a pneumatic actuator. The pressure source 114 may be a tank of compressed gas in an example. In other examples, the pressure source 114 is a hydraulic pump or other source of energy to cause a movement or action by one or more elements of the system 100.

As discussed above, one suitable manufacturing process in which the system 100 can be used is in the manufacturing of a shoe upper (e.g., an article of footwear foot-securing portion). A shoe upper can be comprised of multiple parts that are overlaid one on top of the other. For instance, difference types of materials may be used for the toe, sides and heel portions of the shoe upper. Often, these particular different materials will need to be precisely placed and overlapped so that they can be later sewn, sealed, adhered, fused, and/or bonded together in any suitable manner.

Figure 3:
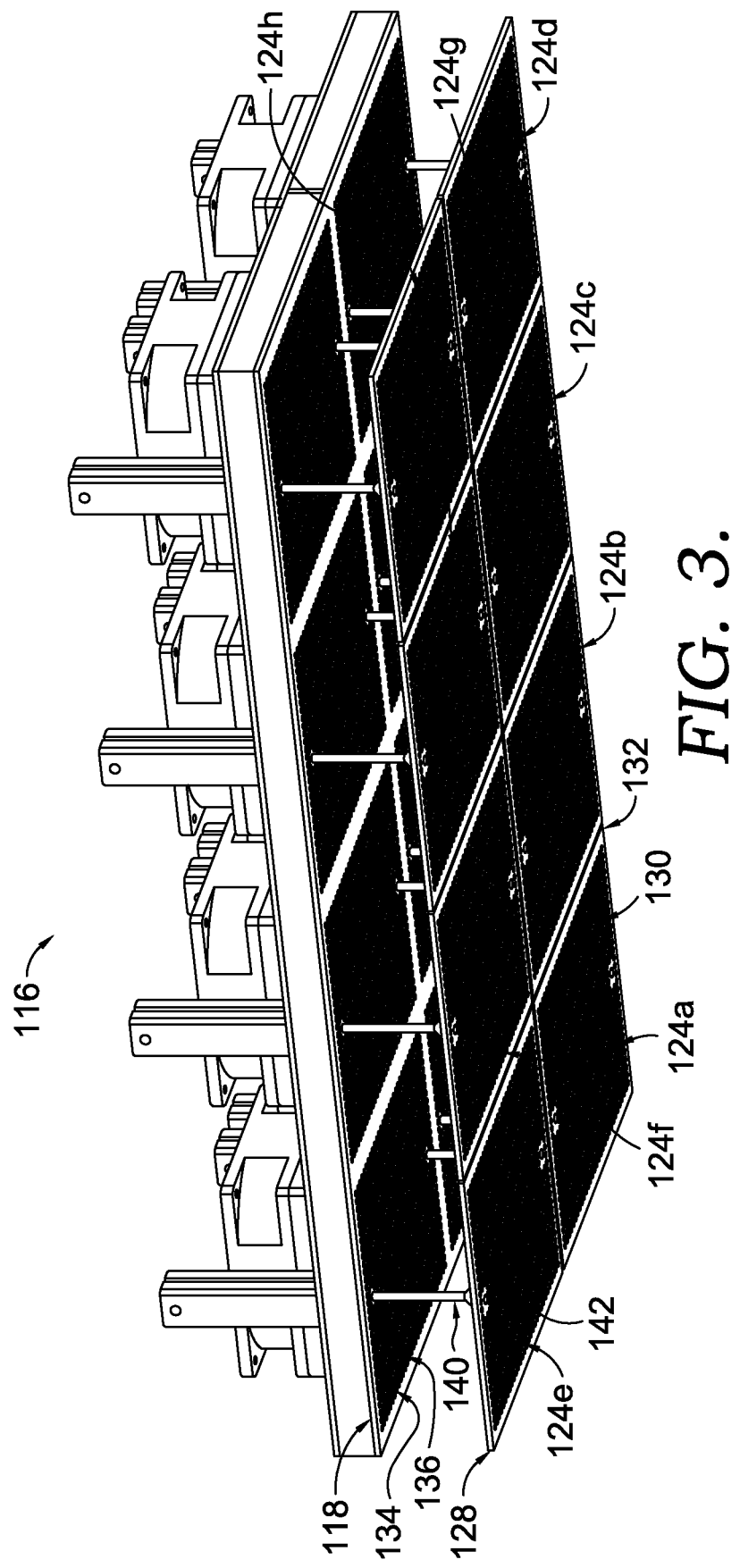
FIG. 3 depicts the exemplary pick-up head of FIG. 2 from a bottom perspective, in accordance with exemplary aspects hereof.
Figure 4:
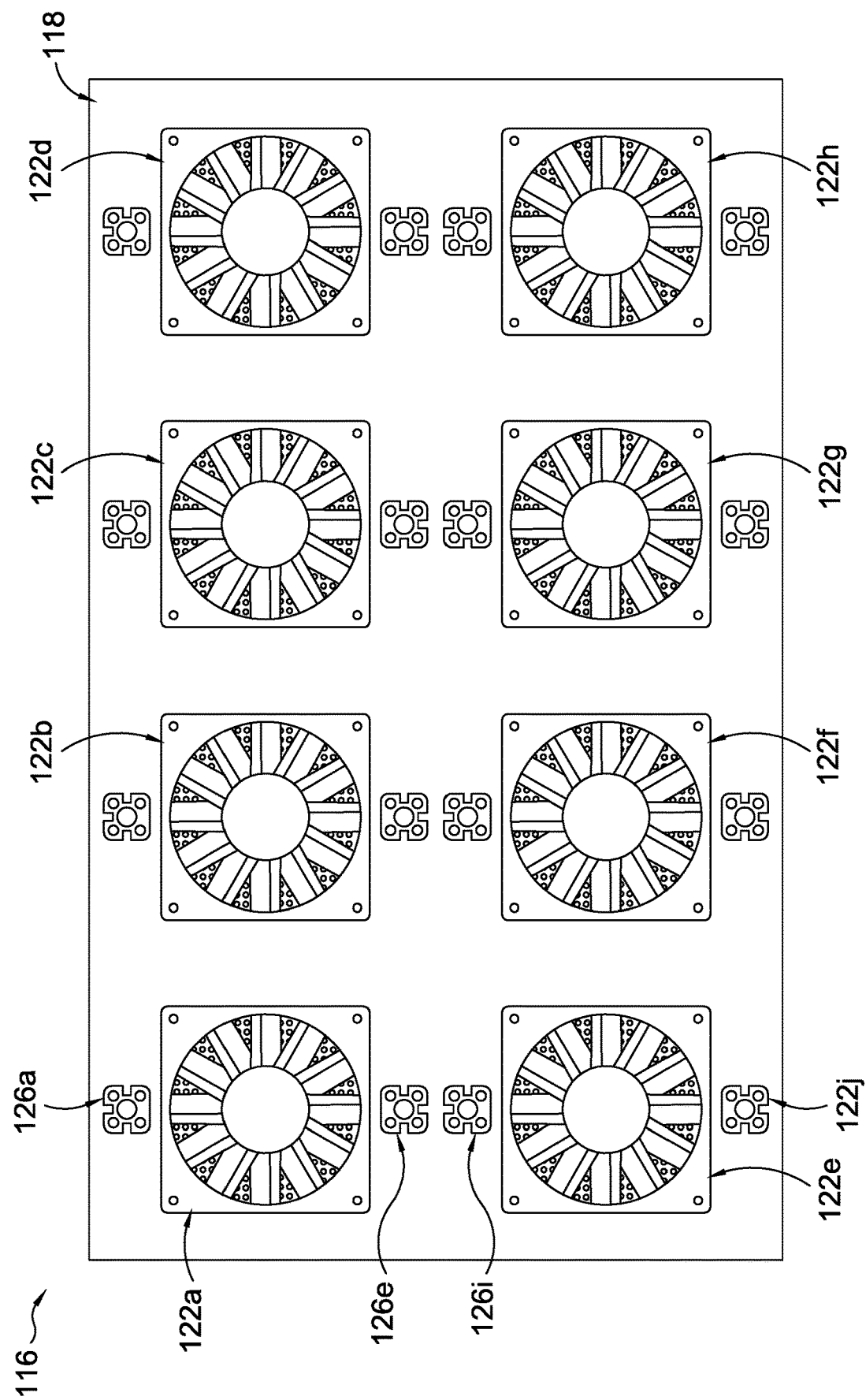
FIG. 4 depicts the exemplary pick-up head of FIG. 2 from a top plan view, in accordance with exemplary aspects hereof.

With reference to FIGS. 2-8, a pick-up head assembly 116 will now be described. With specific reference to FIG. 2, the pick-up head assembly 116 includes a housing 118 having an upper surface 120 that may be rotatably connected to the mechanical arm 102 of FIG. 1. The upper surface 120 also includes a number of suction fans 122*a*-122*h* mounted thereto. Each of the fans 122*a*-122*h* is able to provide a suction/vacuum force (e.g., a reduced pressure relative to ambient conditions) to pick up an item 108 of FIG. 1. Further, each of the fans 122*a*-122*h* is associated with an independently actuatable pick-up zone 124*a*-124*h*, as best depicted in FIG. 3. As will be more fully described below, each of these zones 124*a*-124*h* can be selectively actuated depending on the needs of the pick-up system 100. For instance, depending on the item 108, it may only be necessary to actuate the suction force in the zones 124*b* and 124*f* via the fans 122*b* and 122*f*. As a further example, again depending on the shape, size and weight of the item 108, it may only be necessary to actuate the zones 124*a*, 124*f*, 124*c*, and 124*h* via the fans 122*a*, 122*f*, 122*c*, and 122*h*. Thus, as is apparent at any time, any one or all of the zones 124a-124h can be selectively actuated to accommodate any type of item 108. As will also be described hereinafter, the position of the engaging plate portions at each zone may be adjusted to influence the suction force.

A constraint associated with the actuation of the fans 122a-122h is that when turning them on and off to provide a suction force, there is a lag force with the fans as they are powered down to allow the item 108 to disengage from the pick-up head assembly 116. As will be more fully explained below, in order to address this lagging suction force associated with each of the zones 124a-124h, the zones 124 can be more precisely controlled through adjustment of the position of the engaging plate. Additionally, in some aspects, a speed of a fan may be adjusted to further enhance the release precision of an item therefrom.

Figure 5:
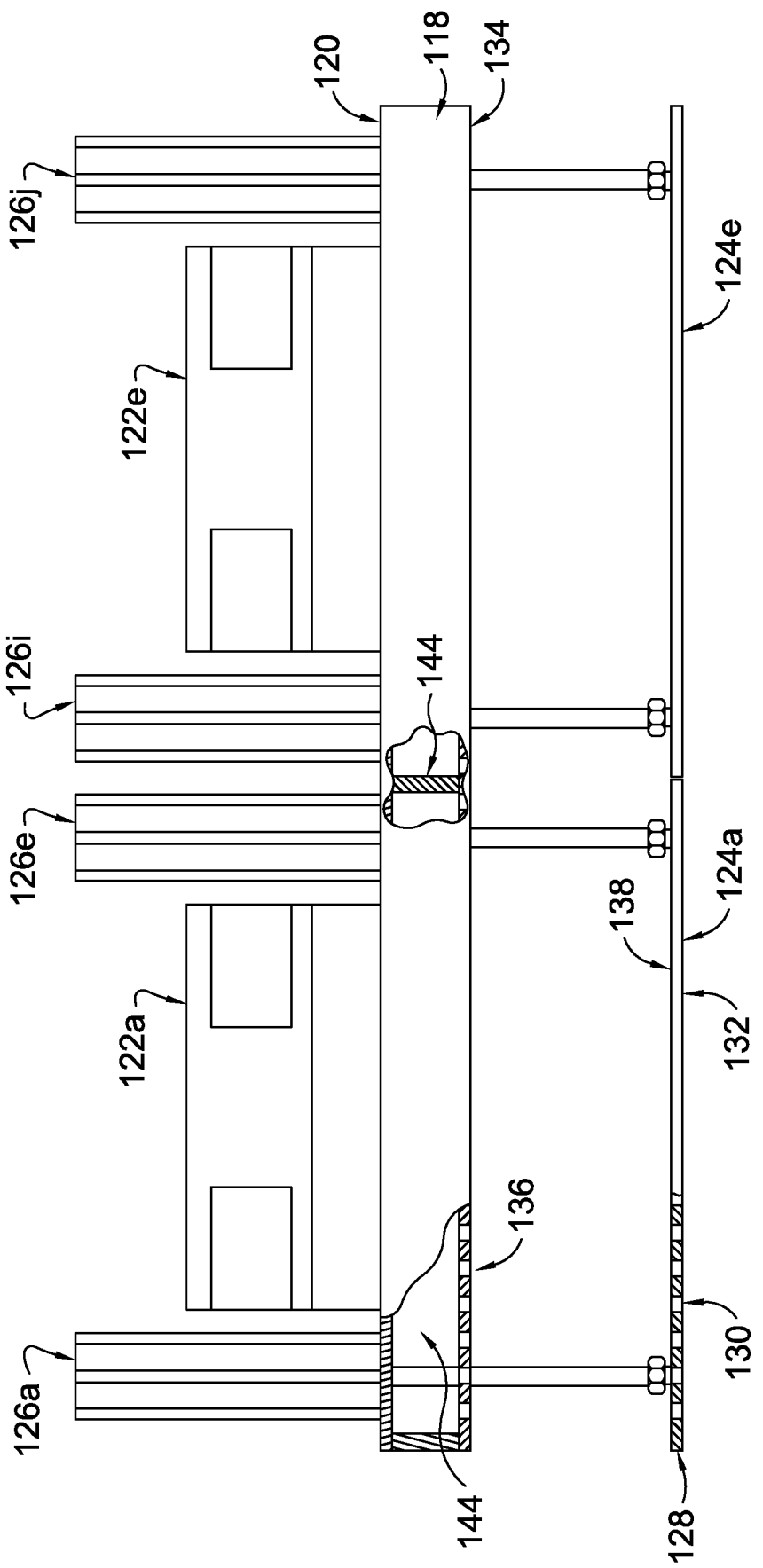
FIG. 5 depicts the exemplary pick-up head of FIG. 2 from a left side view with parts broken away to reveal details of construction, in accordance with aspects hereof.
Figure 6:
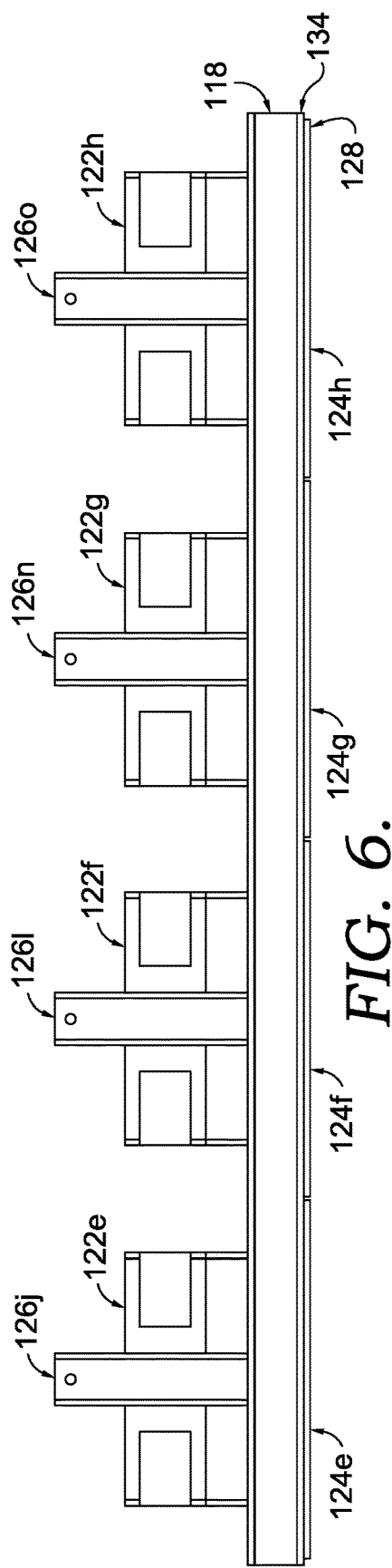
FIG. 6 depicts the exemplary pick-up head of FIG. 2 from a front perspective with the engaging plate in a first position, in accordance with aspects hereof.
Figure 7:
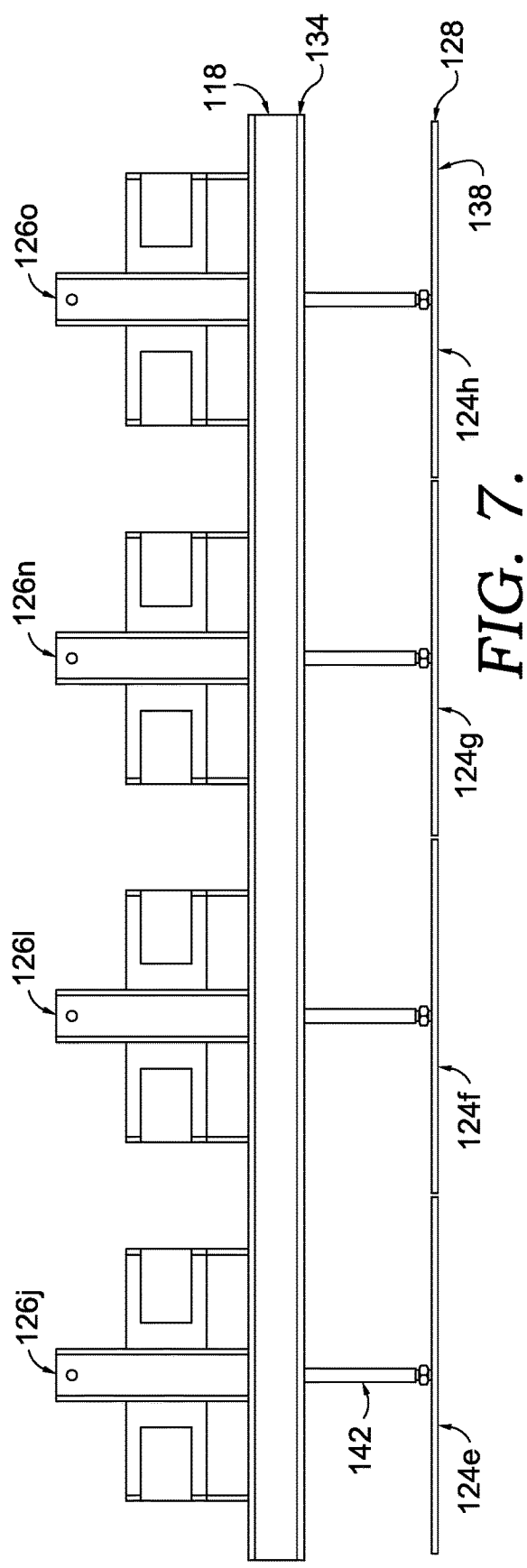
FIG. 7 depicts the exemplary pick-up head of FIG. 2 from a front perspective with the engaging plate in a second position, in accordance with aspects hereof.

The housing 118, as best seen in FIG. 5 with cutaway portions, may be formed to have a plurality of discrete housing zones that correspond with, in an example, zones of the engaging plate 128. A zone divider 144 is depicted as segregating one portion of the housing 118 from another portion of the housing 118. As such, independent control of the fan 122 in a zone of the housing is not contaminated with influences from a separate independently controlled fan 122. For example, as seen in FIG. 5, a zone of the housing 118 is established by a plurality of zone divider 144 and housing wall portions surrounding the fan 122a and corresponding with the zone 124a. While not shown through cutaway, the fan 122e is also associated with a discrete zone of the housing 118 by zone dividers 144 and housing wall portions to correspond with the zone 124e. It is contemplated that any number of fans 122 may be used in a single zone. Further, it is contemplated that a single fan may service multiple zones formed by zone dividers 144 and/or portions of the engaging plate 128. A zone divider 144 may be a wall or other obstructions that segregates an internal portion of the housing 118 from another portion of the housing 118. This segregation allows for individual control of an amount of suction force for a given zone or region by preventing cross contamination of suction force between the zones. Stated differently, the zone divider 144 allows the common housing 118 to have discrete vacuum suction force zones by compartmentalizing the suction force generated by a fan (or fans) in a specific zone from the suction force generated by a fan (or fans) in a second specific zone.

The pick-up head assembly 116 includes a generally planar engaging plate 128 positioned on the bottom of the housing 118. The engaging plate may be divided into a plurality of discrete plate portions referred to as zones (e.g., zones 124a-h). Each of these independently positionable plate portions in totality form the engaging plate 128. The engaging plate 128 may be formed from any number of zones. A single zone, 2 zones, 3 zones, 4 zones, 5, zones, 6, zones, 7 zones, 8 zones as depicted, or any number of zones. Any of the zones may be independently positioned or any of the zones may be positioned in concert with or collectively positioned with any other zones. The zones 124 may be any size, shape, orientation. The zones 124 may be similar in size, shape and/or orientation. The zones 124 may be different in size, shape and/or orientation.

The engaging plate 128 includes a plurality of apertures 130 that allow the suction/vacuum force generated by the fans 122a-122h to engage the item 108. The engaging plate 128 includes a bottom surface 132 as best seen in FIG. 3 for engaging the item 108. The engaging plate 128 is depicted as being generally planar, but can be of any type of shape, for instance curved, angular or parabolic. The engaging plate 128, in an example, is shaped to accommodate the shape and the resulting positioning of the item 108. The shape and contours of the engaging plate 128 is limitless based upon the manufacturing process involving the item 108. The bottom surface 132 directly engages the item 108. The apertures 130 allow the suction force generated by the fans 122a-122h to be applied directly to the item 108. The engaging plate may be formed from any material. In an example, the engaging plate 128 is a metallic material, such as aluminum. In an additional example, the engaging plate 128 is a polymer material. Further yet, it is contemplated that the engaging plate is a non-conforming (e.g., substantially rigid) material to which the item to be picked up conforms or does not conform. In yet other examples, the engaging plate 128 may include a conforming bottom surface so that the engaging plate 128 conforms to at least a portion of the to-be-picked item forming a seal enhancing the suction generated thereon. In FIG. 3, the bottom surface 134 of the housing is depicted as having a plurality of apertures 136. The plurality of apertures 136 are optional and may be omitted in favor of another porous structure (e.g., omitted structure all together, a screen, a grid-like pattern) that allows for the drawing of vacuum through the housing to the fans. In the example of FIG. 3, it is contemplated that each of the plurality of aperture 136 coordinate with and potentially align with respective apertures 130 of the engaging plate 128 to minimize interference of air flow. The inclusion of the plurality of aperture 136 serves as a guard against foreign debris from entering into the housing and the fan(s), in an exemplary aspect.

The pick-up head assembly 116 includes a plurality of independently controllable actuators 126a-126p that will be described. The actuators 126 are shown as pneumatic cylinders, but could be any other type of actuator capable of linear movement, for instance a hydraulic cylinder, a solenoid, or a mechanical linkage, etc. Each actuator 126 includes a base mounted to the top surface 138 of the engaging plate 128. The actuator 126 also includes a cylinder having a moveable piston 140 disposed therein. Each piston includes an attachment end that is secured to the item engaging plate 128 by any suitable connection structure 142 for instance a pin, adhesive, bolts, nuts, etc. The piston 140 is movable between a retracted position and an extended position. The retracted position corresponds to a pickup position (e.g., a first position) of the zone 124 and an extended position corresponds to a release position (e.g., a second position) of the zone 124. The actuator 126 can be biased towards its retracted position by any suitable structure for instance a spring, a rubber band, a deflector plate, etc. This is especially helpful if the actuator 126 is powered in a single direction, for instance powered toward the extended position. More specifically, and for example, if the actuator 126 is a pneumatic actuator and has a single action cylinder, then the piston 140 will move to its extended position when air pressure is applied to the cylinder via for instance an air supply coupling 115 and pressure source 114. Because the cylinder can be single action, a biasing structure is effective to return the piston to its retracted position once sufficient air pressure is no longer supplied to the cylinder. The extended position of the piston corresponds to the release position of the zone 124.

Thus, for example, if no air pressure is applied to the cylinder, the piston 140 is held in its retracted position by a biasing structure associate with the cylinder. This unactuated state of the cylinder results in the apertures 130 of the engaging plate 128 being positioned adjacent to the vacuum assembly, in an example, such that suction force is fluidly passed through the apertures 130 as opposed to biasing the apertures 130 when positioned in an extended manner of a release position. The cylinders are depicted in their retracted positions in FIG. 6, which corresponds to the first position of the respective zone 124. The cylinders are depicted in their extended positions in FIGS. 2, 3, 5, and 7, which corresponds to the second position of the respective zones 124.

A distance generated between the top surface 138 of the engaging plate 128 and the bottom surface 134 of the housing 118 by movement of the actuators 126 may be any distance. In an exemplary aspect, a distance created between a first position and a second position is 1 mm, 2 mm, 3 mm, 4 mm, 5 mm, 10 mm, 15 mm, 20 mm, 25 mm, 30 mm, 35 mm, 40 mm, 45 mm, 50 mm, or any distance therebetween. The distance of separation between the engaging plate 128 and the housing 118 may be used to adjust an amount of suction force experienced at the bottom surface 132 that is generated by the fans 122. The greater the distance between the engaging plate 128 and the housing 118 the less suction force generated by the fans 122 that is experienced at the bottom surface 132. This reduction in experienced suction force is a result of alternative conduits for fluid flow to the fans 122, such as through the space created between the engaging plate 128 and the housing 118 as a result of the extension of one or more actuators.

The adjustment of experienced suction at the bottom surface 132 may be near instantaneous through the actuation of one or more zones 124 away from the housing 118. This adjustment in suction may be used during a pick or place operation. For example, following an initial capture of an item by a zone 124, the zone 124 may be extended slightly to immediately reduce the suction force experienced at the bottom surface 132 of the zone 124 to prevent the item from being marked, marred, deformed, or otherwise damaged by exposure to extended excessive suction force. An example may be a fragile foil, polymer, paper, light-textile, and the like that may begin to conform to one or more apertures of the bottom surface 132, such as the aperture 130, through which the suction force is drawn. Stated differently, a greater amount of suction force may be used to initially adhere an item to the engaging plate 128, but that item may begin to deform into the apertures 130 with continued suction force of the same level as used to acquire the item. Because of a momentum lag of the fan apparatus, a mere slowing of the fan may not occur in a fast enough manner to reduce the suction force prior to deforming the item. Therefore, an immediate extension of the engaging plate 128 from the housing 118 can cause an immediate reduction in the suction force experienced at the bottom surface 132.

Figure 8:
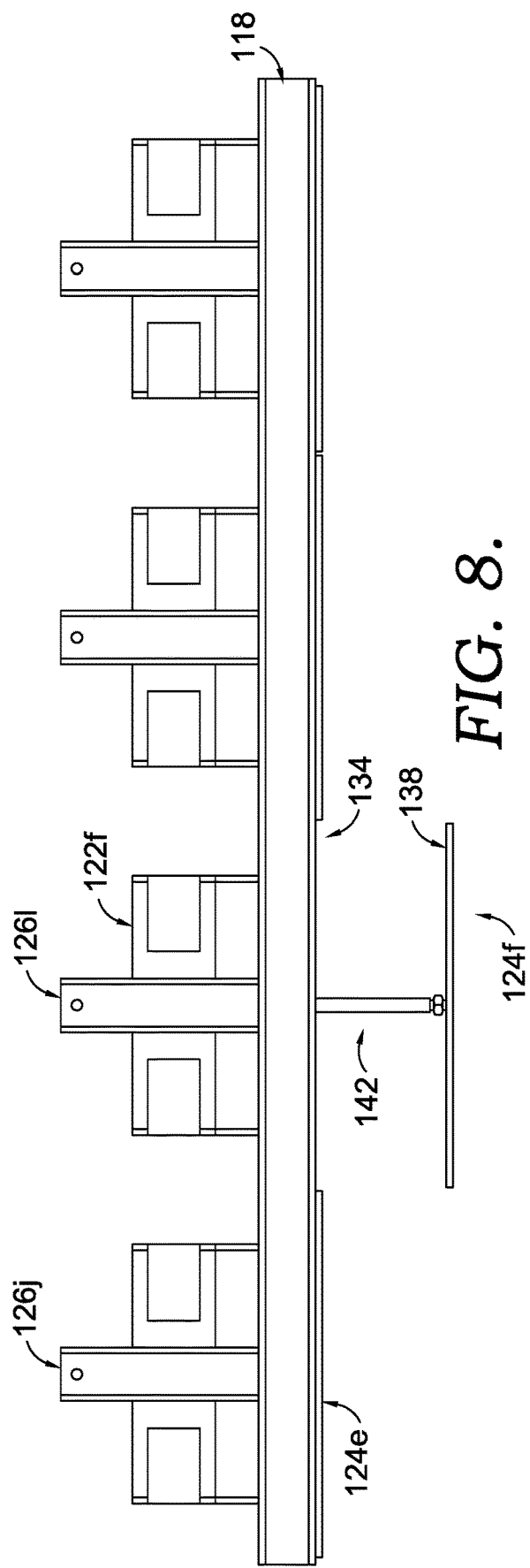
FIG. 8 depicts the exemplary pick-up head of FIG. 2 from a front perspective with the a zone of the engaging plate in a second position and other zones of the engaging plate in a first position, in accordance with aspects hereof.

Multiple actuators may be associated with a common zone. For example, two actuators of the plurality of actuators 126 are depicted with each of the zones 124. When multiple actuators are associated with a common zone 124, the actuators are contemplated to operate in concert such that they are in retracted and extended positions at common times to ensure parallel placement of the zone 124 during movement and extension. Any number of actuators may be associated with a given zone 124 or the engaging plate 128 as a whole. Actuators 126 associated with different zones 124 are independently controlled such that one zone may be in an extended position while an adjacent zone may be in a retracted position, as best seen in FIG. 8. The ability to independently control the position of a zone relative to other zones allows for zonal use of the pick-up head assembly 116 such that multiple items may be maintained by a common pick-up head assembly during a single pick and place operation with the different items able to be selectively placed in a different orientation than they are maintained on the pick-up head assembly. Additionally, having a zonal approach allows for movement of less mass associated with portions of the engaging plate 128 that do not have an item thereon. Stated differently, portions of the engaging plate that are not in contact with the item to be released need not be moved to effectuate a release of the item from the engaging plate, which reduces mass being moved during each placement operation that saves energy and reduces wear on the components.

As is apparent, the structures described above, result in the ability to independently position any of the zones 124a-124h in a first position, a second position or an intervening position therebetween. The position of the zones 124 relative to the housing 118 has a direct relationship to an amount of suction force that passes through the one or more apertures of the zones 124 and the amount of suction force that passes between the engaging plate 128 and the housing 118 in the space created by extending the engaging plate 128 away from the bottom surface 134 of the housing 118. Stated differently, when the actuators 126 are in the retracted position, the suction force generated by the fan 122 is drawn through the apertures 130 of the respective zone 124 causing a vacuum force effective for pickup at the bottom surface 132 of the engaging plate 128. This is a result of minimal air being able to be drawn between the engaging plate top surface 138 and the housing bottom surface 134 when in the retracted position. An example contemplates a seal (e.g., a conformable material, such as a foam, silicone, or rubber) aiding in sealing a connection between the housing 118 and the engaging plate 128 when in the retracted position. As the actuators 126 extend a zone 124 (i.e., a portion of the engaging plate 128) in a direction away (e.g., perpendicular to a plane in which the engaging plate 128 extends), a gap forms between the housing 118 bottom surface 134 and the engaging plate top surface 138. This formed gap provide an alternative route for the suction force of the fans 122 to flow instead of through the apertures 130 of the zone 124 now in the extended or non-retracted position. This alternative conduit for the suction force limits the pickup force provided by the fans 122 through the zone 124. It is this increased space that allows for the disengagement of the item from the engaging plate 128 without stopping the generation of vacuum from the fan. As the suction force experienced at the bottom surface 132 is reduced, the mass of the item engaged with the engaging plate 128 causes the item to disengage from the engaging plate 128 to be placed. Therefore, by extending one or more elements of an actuator to cause the engaging plate to extend away from the housing 118, the item is released from the adherence of the suction force and placed on a surface, object, and/or position. This extension of the plate portion defining a zone of the engaging plate is therefore effective to quickly release an item from the suction force of the fan 122 without waiting for the fan 122 itself to reduce the suction force completely.

In addition to extending a zone 124 of the engaging plate 128 away from the housing 118 to cause a release of an item, it is contemplated that the speed of the fan 122 may be adjusted as well. For example, in anticipation of, or as a result of, an actuator extending to move a zone 124, the controller 106 may control the fan 122 to reduce a fan speed (e.g., this may be accomplished though a regulator, a voltage control, and other speed controlling mechanisms). The reduction in the fan speed allows for an additional reduction in the fan speed during a depositing (e.g., placing) operation of the item previously engaged with the engaging plate 128.

This reduction in suction force generated at the fan level limits secondary suction that occurs in the gap created between the engaging plate 128 and the housing 118 during an extension of the engaging plate 128 from the housing 118 during a placing operation. The secondary suction can create unintended air movement around the system 100 that can alter a position or placement of an item. Therefore, to prevent the unintended movement of an item as caused by the secondary suction, a reduction in fan speed is advantageous. The reduction in fan speed results in a reduction in suction force generated by the fan. Therefore, a reduction in fan speed causes a reduction in secondary suction experienced when the engaging plate 128 extends away from the housing 118.

In an example, the controller 106 instructs the actuator 126 to extend a zone 124 while also instructing (or causing) a reduction in speed of the fan 122. The fan 122 may operate at a first speed during a capture operation for an item and the controller 106 may cause a reduction in the fan speed to a second speed during a release operation of the item. The second speed has less suction force generated than the first speed. In another example, the first speed results in a suction force of 60% to 100% of maximum sustained suction force generated by the fan. The second speed results in a suction force in the range of 0% to 60% of the maximum sustained suction force. A maximum sustained suction force is a suction force generated by the vacuum assembly (e.g., fan 122) when operating under normal recommended operating conditions for the fan 122. For example, when the electric fan is operating under intended maximum voltage or other maximum electrical conditions, a sustained suction force is generated that established the maximum sustained suction force generated from which the first suction force amount and the second suction force amount may be measured.

Figure 9:
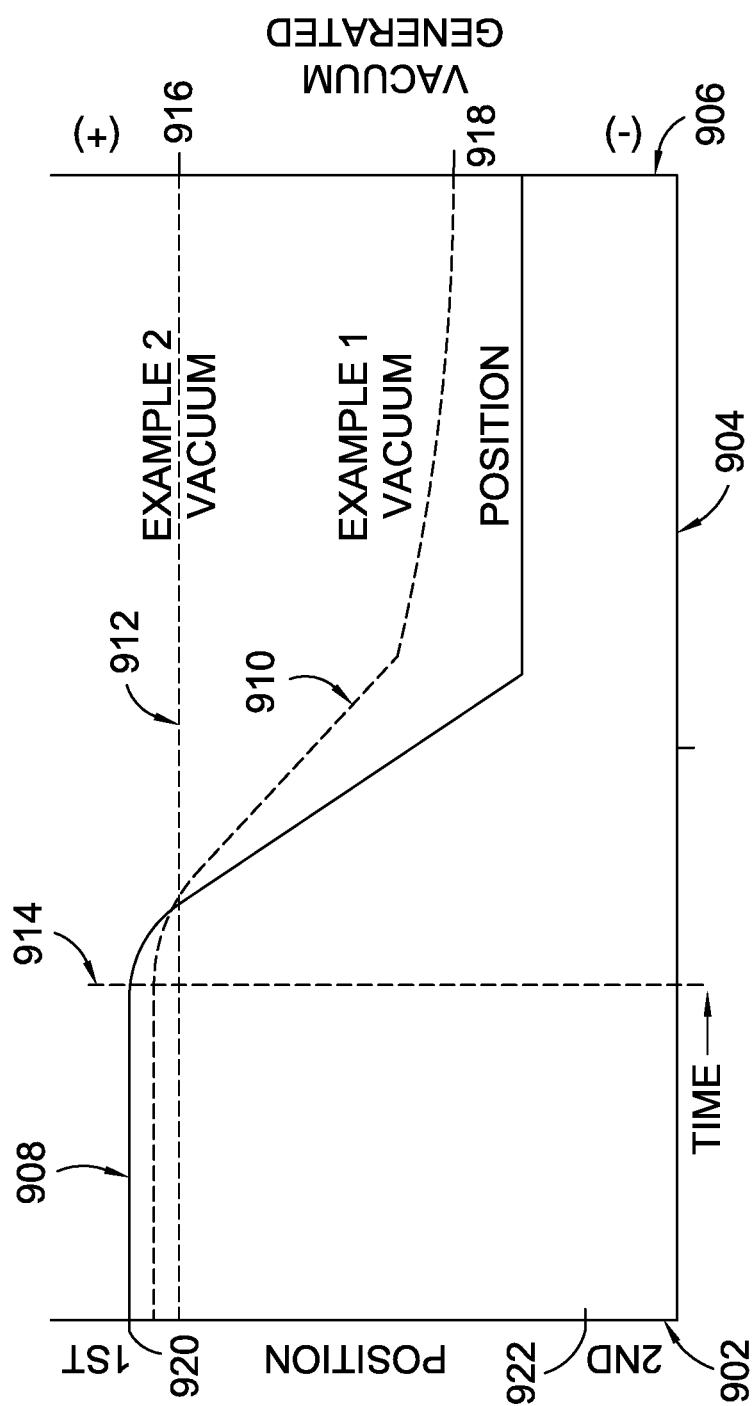
FIG. 9 depicts a graph representing an example of an engaging plate position and a suction force generation relative to time, in accordance with exemplary aspects hereof.

FIG. 9 depicts a graph representing an example of an engaging plate position and a suction force generation relative to time, in accordance with exemplary aspects hereof. A position of a zone of the engaging plate is represented on a left-most axis 902 of the graph. The position is a position of an engaging plate. Time in an operation is represented in the horizontal axis 904. An amount of vacuum generated at a fan is represented in the right-most axis 906. Looking at the engaging plate position that starts at a first position 920 and ends at a second position 922, the first position 920 may be a retracted position of an actuator that allows for the pickup of an item. The second position 922 is an extended position of an actuator that allow for the placement of the item. As seen when reviewing a position line 908, at a time 914, the engaging plate begins to transition from the first position 920 to the second position 922. This position change may be effectuated by a controller or an operator through signals or other inputs to one or more actuators connecting the engaging plate to the housing.

As the position of the engaging plate begins to change, a first example of the amount of suction force being generated by the fan is represented by a line 910. This first example of vacuum generation by line 910 contemplates controlling a fan speed to reduce an amount of suction force generated in connection with, or in concert with, the change of position represented by the position line 908. The amount of suction force generation in the line 910 is shown to reduce after the time 914 to further aid in depositing or placing an item from the pickup tool. The suction force generated (also referred to as vacuum generated) in this first example of line 910 is reduced from an initial amount to a final amount of 918.

A second example of the suction force generation is depicted by a line 912. In this second example, the amount of suction force generated is maintained constant at an amount 916. Therefore, the second example does not adjust the fan speed or other variable relating to the generation of suction force in relation to the position of the engaging plate. In this example, the movement of the engaging plate away from the housing to create the alternative conduits for the vacuum to pass instead of through the engaging plate is sufficient to deposit or place the attached item.

Depending on an item to be picked and placed, different configurations of position and suction force may be utilized. For example, an item having greater mass and less surface area may be less affected by the secondary vacuum or turbulence generated by the fan(s) as the engaging plate extends away from the housing to expose the alternative conduit for the vacuum and therefore the suction force generation may be maintained while still achieving a sufficiently precise placement of the item. On the other hand, a lower mass and greater surface area item may be more affected by the secondary vacuum or turbulence generated by the conduit formed between the engaging plate and the housing such that a reduction in suction force provides a more controlled and precise placement of the item.

Figure 10:
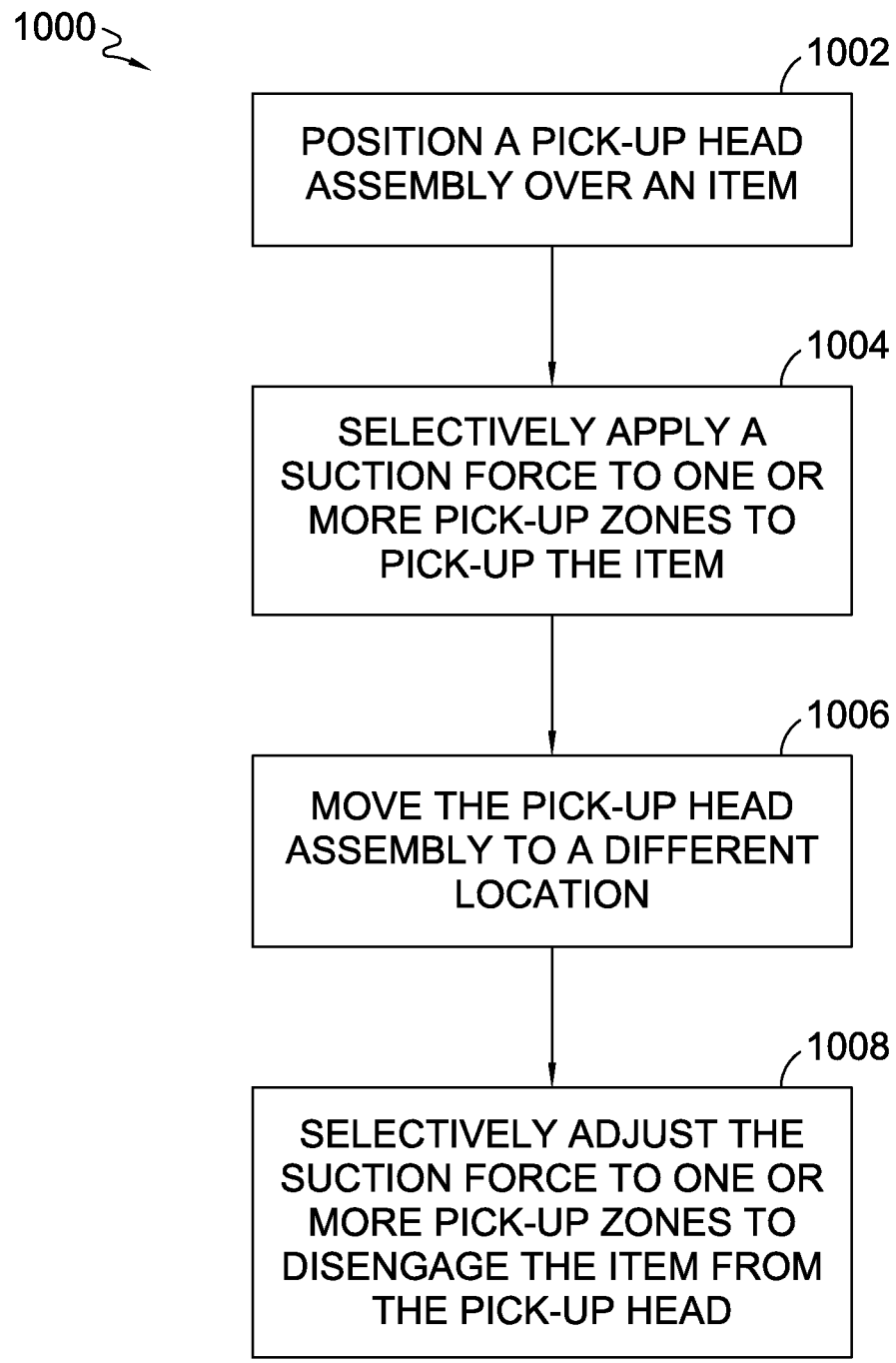
FIG. 10 depicts an exemplary method of moving an item from one location to another location, in accordance with exemplary aspects hereof.

FIG. 10 depicts an exemplary method 1000 of moving an item from one location to another location, in accordance with exemplary aspects hereof. At a block 1002 a pick-up head assembly, such as the pick-up head assembly 116 of FIGS. 2-8, is positioned over an item. The positioning of the pick-up head assembly may be accomplished by a mechanical arm, such as a robot, or by a manual method of a human operator. It is contemplated that a vision system may guide the positioning of the pick-up head assembly to position the pick-up head assembly during the pick-up operation so that the item is captured on the pick-up head assembly at an appropriate location for future release or deposit.

At a block 1004, a selective application of suction force to one or more pick-up zones is applied to pick-up the item. For example, a controller may cause one or more fans associated with one or more of the discrete zones to begin generating a suction force. The amount of suction force generated may be controlled, such as through fan speed, to apply an appropriate amount of suction force to a zone for the item to be picked-up. The selection of zones for picking up the item that are activated may be limited to those zones that will be associated with the item during a pick and place operation. Alternatively, zones in proximity to, but not necessarily engaging with the item, may also be activated to provide a margin around the item. Further yet, it is contemplated that all of the zones are activated to apply suction force irrespective of where the engagement of the item will occur on the engaging plate.

At a block 1006, the pick-up head assembly is moved to a different location while maintaining the item. The movement of the pick-up head assembly may be accomplished through the use of the mechanical arm or through manual manipulation. The controller or a separate controller, in an example, is responsible for controlling the movement of the pick-up head assembly movement and position to effectively deposit the item. A vision system having a camera or other visual detection mechanism may aid in positioning the pick-up head assembly such that the placement of the item maintained thereon is appropriately positioned at the deposit location.

At a block 1008, the suction force is selectively adjusted at one or more of the pick-up zones to disengage the item from the pick-up head assembly. A first manner of adjusting the suction force at the engaging plate is to move the engaging plate from a first position in proximity or contact with a housing to a second position spaced from the housing. This second position creates a gap between the engaging plate and the housing that serves as an alternative conduit for the suction force as opposed to through the engaging plate. An additional or alternative manner of adjusting the suction force as experienced at the engaging plate item-contacting surface is through a change in the suction force generated by the fan(s). For example, a fan speed may be reduced such that the fan generates less suction force that is translated to the engaging plate item-contacting surface.

While specific configurations, components, sizes, orientations, and numbers are provided in the present disclosure, they are example and not limiting. Instead, for example, aspects depict a dedicated fan associated with each of the eight zones. The present disclosure contemplates while not explicitly depicting variations to this arrangement. For example, a pick-up head assembly may be comprised of a single zone having multiple fans, two zones having one fan per zone, two zones with multiple fans per zone, three zones with one or more fans per zone, four zones with one or more fans per zone, and the like. Further, a number of actuators associated with a zone or the plate may be adjusted. For example, the figures depict two actuators coupling each zone with the housing; however, it is contemplated that any number of actuators may be associated with each of the zones. Further yet, while the engaging plate is depicted as having discrete zones that are independently positioned, it is contemplated that the engaging plate may be a continuous element such that all zones move in unison irrespective of an associated zone formed in the housing through one or more zone divider.

From the foregoing, it will be seen that this invention is one well-adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

While specific elements and steps are discussed in connection to one another, it is understood that any element and/or steps provided herein is contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

As used herein and in connection with the claims listed hereinafter, the terminology "any of clauses" or similar variations of said terminology is intended to be interpreted such that features of claims/clauses may be combined in any combination. For example, an exemplary clause 4 may indicate the method/apparatus of any of clauses 1 through 3, which is intended to be interpreted such that features of clause 1 and clause 4 may be combined, elements of clause 2 and clause 4 may be combined, elements of clause 3 and 4 may be combined, elements of clauses 1, 2, and 4 may be combined, elements of clauses 2, 3, and 4 may be combined, elements of clauses 1, 2, 3, and 4 may be combined, and/or other variations. Further, the terminology "any of clauses" or similar variations of said terminology is intended to include "any one of clauses" or other variations of such terminology, as indicated by some of the examples provided above.

The following clauses are aspects contemplated herein.

Clause 1. An apparatus for picking up and positioning an item comprising: a vacuum assembly capable of generating a suction force; an item engaging plate positioned adjacent the vacuum assembly in a first position and offset from the vacuum assembly in a second position, wherein the item engaging plate has at least one aperture formed therein such that the suction force can be applied to the item through the aperture when the item engaging plate is in at least the first position; and an actuator, the actuator joining the vacuum assembly and the item engaging plate and capable of adjusting the item engaging plate between at least the first position and the second position.

Clause 2. The apparatus of clause 1, wherein the vacuum assembly includes a fan for creating the suction force.

Clause 3. The apparatus of any of the clauses, wherein the vacuum assembly includes a plurality of fans for creating suction force in a plurality of discrete pick-up zones of the item engaging plate.

Clause 4. The apparatus of any of the clauses, wherein the item engaging plate is generally planar.

Clause 5. The apparatus of any of the clauses further comprising a controller, the controller capable of adjusting an amount of suction force generated by the vacuum assembly.

Clause 6. The apparatus of clause 5, wherein the controller is further capable of controlling the actuator to adjust a position of the item engaging plate between the first position and the second position.

Clause 7. The apparatus of clause 6, wherein the controller controls an amount of suction force generated by the vacuum assembly to a first amount of suction force generated when the item engaging plate is in the first position and controls the amount of suction force generated by the vacuum assembly to a lesser second amount of suction force generated when the item engaging plate is at the second position.

Clause 8. The apparatus of clause 7, wherein the first amount of suction force generated is in a range of 60% and 100% of maximum sustained suction force generated by the vacuum assembly and the second amount of suction force generated is in a range of 0% to 60% of maximum sustained suction force generation by the vacuum assembly.

Clause 9. The apparatus of clause 8, wherein the vacuum assembly is comprised of an electric fan associated therewith to generate the suction force and the first amount of suction force generated is associated with the electric fan operating at a first speed and the second amount of suction force generated is associated with the electric fan operating at a lesser second speed.

Clause 10. The apparatus of the clauses, wherein the item engaging plate is comprised of a plurality of independently positioned plate portions with each plate portion defining a different zone of the item engaging plate.

Clause 11. The apparatus of clause 10, wherein each plate portion of the plurality of plate portions is independently adjustable between at least the first position and the second position.

Clause 12. The apparatus of clause 11, wherein the actuator joins a first plate portion of the plurality of plate portions to the vacuum assembly and a second actuator joins a second plate portion of the plurality of plate portions to the vacuum assembly such that the first plate portion and the second plate portion are independently moveable between the first position and the second position.

Clause 13. The apparatus of clause 12, wherein the vacuum assembly is comprised of a first electric fan capable of generating suction force through an aperture of the first plate portion and the vacuum assembly is comprised of a second electric fan capable of generating suction force through an aperture of the second plate portion.

Clause 14. The apparatus of clause 13, wherein a controller is logically coupled with the first electric fan, the second electric fan, the actuator, and the second actuator and capable of independently controlling each of the first electric fan, the second electric fan, the actuator, and the second actuator.

Clause 15. An apparatus for moving an item from one location to another location comprising: a mechanical arm capable of moving from one location to another; a pick-up head coupled to the mechanical arm and capable of engaging and disengaging the item, the pick-up head including; an engaging plate for directly contacting the item, wherein the engaging plate is divided into a plurality of independently actuated pick-up zones and wherein each zone has at least one aperture formed therein; a vacuum mechanism capable of providing a suction force to each of the pick-up zones; a plurality of independently controlled actuators, wherein each actuator is associated with one of the pick-up zones and wherein each pick-up zone is capable of being independently actuated by an associated actuator between a first position positioning the pick-up zone at a first distance from the vacuum mechanism that allows the suction force to pass through the respective zone and a second position positioning the pick-up zone at a greater second distance from the vacuum mechanism that reduces the suction force at the respective zone.

Clause 16. The apparatus of clause 15, wherein the vacuum mechanism includes a plurality of fans and wherein each zone has a fan associated therewith.

Clause 17. The apparatus of clause 16 further comprising a controller capable of independently controlling each of the plurality of fans and each of the independently controlled actuators.

Clause 18. The apparatus of clause 17, wherein a speed of each fan of the plurality of fans is adjustable between at least a first speed and a second speed where the first speed is greater than the second speed.

Clause 19. The apparatus of clause 18, wherein a first fan of the plurality of fans operates at the first speed when a first pick-up zone of the plurality of independently actuated pick-up zones is at a first distance relative to the first fan and the first fan operates at the second speed when the first pickup zone is at a second distance relative to the first fan.

Clause 20. A method of picking up an item for positioning from one location to another location using a pick-up head having a plurality of pick-up zones and a vacuum mechanism, the method comprising: selectively applying a suction force to one or more of the pickup zones to pick up the item; and selectively adjusting the suction force to one or more of the pick-up zones to disengage the item from the pickup head, wherein adjusting of the suction force is from adjusting a distance of an engaging plate position relative to a vacuum mechanism and capable of disrupting a suction force flowing through apertures of the engaging plate.

The invention claimed is:

1. A apparatus for picking up and positioning an item, comprising:
 a vacuum assembly capable of generating a suction force;
 an item engaging plate positioned adjacent the vacuum assembly in a first position and offset from the vacuum assembly in a second position, wherein the item engaging plate has at least one aperture formed therein such that the suction force can be applied to the item through the at least one aperture when the item engaging plate is in at least the first position and wherein the item engaging plate is comprised of a plurality of independently positioned plate portions with each plate portion defining a different zone of the item engaging plate; and
 an actuator, the actuator joining the vacuum assembly and the item engaging plate and capable of adjusting the item engaging plate between at least the first position and the second position.

2. The apparatus of claim 1, wherein the vacuum assembly includes a fan for creating the suction force.

3. The apparatus of claim 1, wherein the vacuum assembly includes a plurality of fans for creating suction force in a plurality of discrete pick-up zones of the item engaging plate.

4. The apparatus of claim 1, wherein the item engaging plate is generally planar.

5. The apparatus of claim 1 further comprising a controller, the controller capable of adjusting an amount of suction force generated by the vacuum assembly.

6. The apparatus of claim 5, wherein the controller is further capable of controlling the actuator to adjust a position of the item engaging plate between the first position and the second position.

7. The apparatus of claim 6, wherein the controller controls an amount of suction force generated by the vacuum assembly to a first amount of suction force generated when the item engaging plate is in the first position and controls the amount of suction force generated by the vacuum assembly to a lesser second amount of suction force generated when the item engaging plate is at the second position.

8. The apparatus of claim 7, wherein the first amount of suction force generated is in a range of 60% and 100% of maximum sustained suction force generated by the vacuum assembly and the second amount of suction force generated is in a range of 0% to 60% of maximum sustained suction force generation by the vacuum assembly.

9. The apparatus of claim 8, wherein the vacuum assembly is comprised of an electric fan associated therewith to generate the suction force and the first amount of suction force generated is associated with the electric fan operating at a first speed and the second amount of suction force generated is associated with the electric fan operating at a lesser second speed.

10. The apparatus of claim 1, wherein each plate portion of the plurality of plate portions is independently adjustable between at least the first position and the second position.

11. The apparatus of claim 10, wherein the actuator joins a first plate portion of the plurality of plate portions to the vacuum assembly and a second actuator joins a second plate portion of the plurality of plate portions to the vacuum assembly such that the first plate portion and the second plate portion are independently moveable between the first position and the second position.

12. The apparatus of claim 11, wherein the vacuum assembly is comprised of a first electric fan capable of generating suction force through an aperture of the first plate portion and the vacuum assembly is comprised of a second electric fan capable of generating suction force through an aperture of the second plate portion.

13. The apparatus of claim 12, wherein a controller is logically coupled with the first electric fan, the second electric fan, the actuator, and the second actuator and capable of independently controlling each of the first electric fan, the second electric fan, the actuator, and the second actuator.

14. An apparatus for moving an item from one location to another location comprising:
   a mechanical arm capable of moving from one location to another;
   a pick-up head coupled to the mechanical arm and capable of engaging and disengaging the item, the pick-up head including;
   an engaging plate for directly contacting the item, wherein the engaging plate is divided into a plurality of independently actuated pick-up zones and wherein each zone has at least one aperture formed therein;
   a vacuum mechanism capable of providing a suction force to each of the pick-up zones;
   a plurality of independently controlled actuators, wherein each actuator is associated with one of the pick-up zones and wherein each pick-up zone is capable of being independently actuated by an associated actuator between a first position positioning the pick-up zone at a first distance from the vacuum mechanism that allows the suction force to pass through the respective zone and a second position positioning the pick-up zone at a greater second distance from the vacuum mechanism that reduces the suction force experienced through the at least one aperture of the respective zone.

15. The apparatus of claim 14, wherein the vacuum mechanism includes a plurality of fans and wherein each zone has a fan associated therewith.

16. The apparatus of claim 15 further comprising a controller capable of independently controlling each of the plurality of fans and each of the independently controlled actuators.

17. The apparatus of claim 16, wherein a speed of each fan of the plurality of fans is adjustable between at least a first speed and a second speed where the first speed is greater than the second speed.

18. The apparatus of claim 17, wherein a first fan of the plurality of fans operates at the first speed when a first pick-up zone of the plurality of independently actuated pick-up zones is at a first distance relative to the first fan and the first fan operates at the second speed when the first pickup zone is at a second distance relative to the first fan.

19. A method of picking up an item for positioning from one location to another location using a pick-up head having a plurality of pick-up zones and a vacuum mechanism, the method comprising:
   selectively applying a suction force to one or more of the pickup zones to pick up the item; and
   selectively adjusting the suction force to one or more of the pick-up zones to disengage the item from the pickup head, wherein adjusting of the suction force is from adjusting a distance of an engaging plate position relative to a vacuum mechanism and capable of disrupting a suction force flowing through apertures of the engaging plate.

* * * * *

UNITED STATES PATENT AND TRADEMARK OFFICE
CERTIFICATE OF CORRECTION

PATENT NO. : 11,420,831 B2
APPLICATION NO. : 16/707928
DATED : August 23, 2022
INVENTOR(S) : Wen-Ruei Chang, Kuo-Hung Lee and Hung-Yu Wu It is certified that error appears in the above-identified patent and that said Letters Patent is hereby corrected as shown below:

In the Specification

- Column 1, Line 7: Delete "2019," and insert -- 2018, --.
- Column 2, Line 20: Delete "the a" and insert -- the --.
- Column 8, Line 63: Delete "though" and insert -- through --.

Signed and Sealed this
Fourteenth Day of February, 2023

Katherine Kelly Vidal
*Director of the United States Patent and Trademark Office*